Dec. 10, 1968 D. R. SCHULTZ 3,415,371
PORTABLE HARVESTERS FOR LEGUMINOUS VEGETABLE CROPS
Filed Oct. 31, 1966 3 Sheets-Sheet 2

Inventor
Dennis R. Schultz
By
Francis W. Anderson
Att'y

Dec. 10, 1968   D. R. SCHULTZ   3,415,371
PORTABLE HARVESTERS FOR LEGUMINOUS VEGETABLE CROPS
Filed Oct. 31, 1966   3 Sheets-Sheet 3

Inventor
Dennis R. Schultz
By Francis W. Anderson
Att'y

United States Patent Office 3,415,371
Patented Dec. 10, 1968

3,415,371
PORTABLE HARVESTERS FOR LEGUMINOUS VEGETABLE CROPS
Dennis R. Schultz, Rossville, Ill., assignor to FMC Corporation, San Jose, Calif., a corporation of Delaware
Filed Oct. 31, 1966, Ser. No. 590,899
9 Claims. (Cl. 209—114)

ABSTRACT OF THE DISCLOSURE

The present invention is directed to apparatus for use in portable harvesters for leguminous vegetable crops such as peas, beans and the like, and more particularly is directed to valve means in the form of a shield for preventing gusts of wind from blowing extraneous material such as parts of leaves, stems, pods and debris in a direction opposite to the normal path of travel of such extraneous material, which path is outwardly from the separating mechanism for ejection through a side opening of the machine.

---

Still more specifically, the harvesting and threshing machines to which the present invention is adapted are portable and either of the self-propelled or pull-types such as disclosed in the co-pending applications of Larry L. Slates et al., Ser. No. 538,689, and the application of Dennis R. Schultz, Ser. No. 564,129 directed to adapting a pea harvester for the harvesting of edible beans and the like, said applications being assigned to the same assignee as the instant application.

In such harvesters the crop is removed from the ground and elevated into one end of a threshing machine in the form of a rotatable screen drum which has beaters therein that intermittently apply blows to the crop and thus burst the pods. The peas pass outwardly through apertures in the screen to conveying means, including an endless separator apron or belt, occasionally referred to in the art as a draper, or cleaning apron, which is inclined and passes the extraneous fine material upwardly and outwardly of the harvester. The draper belt is trained around parallel elongated drums and has an upper run which is inclined to a suitable extent for permitting the relatively round useful crop, such as peas, to roll downwardly under the influence of gravity to other conveying means which transfer the crop to a receptacle for later handling. In normal operation of machines available heretofore, the extraneous material is conveyed upwardly and outwardly of the harvester through an unprotected side opening of the machine for discharge onto the ground.

It has been found, particularly when harvesting in the western areas of the United States and elsewhere, that high velocity wind and gusts of wind enter the unprotected discharge opening and cause the extraneous material to be blown back into the harvesting apparatus at the point of separation of the useful crop from the extraneous material. In other words, the wind tends to blow the extraneous material back onto the conveyor carrying away the useful crop. This is an undesirable condition inasmuch as additional cleaning is required to afford a crop suitable for canning or freezing or the like.

Because of the physical dimension of such portable harvesting equipment, there appears to be a substantial pressure differential between the windward and the leeward sides of the equipment. The machine has such large lateral dimensions that a substantial mass of air is decelerated and gives up velocity energy which increases the static pressure on the windward side of the apparatus. On the leeward side of the harvester a slight vacuum is induced. The net result of the higher-than-atmospheric pressure on one side and lower-than-atmospheric pressure on the other side causes the wind to have an increased velocity through openings presented at the sides of the harvesting equipment. Air tends to flow from the high pressure windward side of the harvester into the harvester through openings in the windward side, move across the inside of the machine, and blow through openings which are necessary in the equipment on the outlet side, through which passes certain other extraneous material in one portion of the operation, as well as the useful crop in another portion of the conveyor apparatus within the equipment. This high velocity flow of air through the machine tends to blow the small extraneous material, which is usually irregular in shape and tends to be borne by the air, backwardly onto the conveyor which carries away the useful crop after being gravitationally separated upon the inclined apron.

This undesired condition appears to be aggravated by the "Coanda-effect" of air moving over a surface; that is, the tendency for a high velocity current of air to follow a surface in its course of travel adjacent such surface. Hence, the high velocity air additionally tends to entrain extraneous material in a path of travel contrary to the desired path of travel for such material.

The present invention substantially reduces the difficulties caused by adverse wind conditions by providing valve apparatus in the form of flexible means for sealingly engaging a portion of the apron where it passes over a drive or idler drum therefor, and being arranged in a manner to prevent wind from entering the discharge opening through which it is desired that extraneous material be emitted from the harvester. The valve is constructed so that extraneous material causes the valve to open to permit the movement of the extraneous material past the valve while preventing air from entering the machine under the influence of wind and causing a reverse movement of material upon the surfaces of the separator apron of the machine.

Accordingly it is a broad object of the invention to provide improvements in portable harvesters for leguminous vegetable crops comprising means for preventing the passage of adverse air currents into the machine while permitting the outward passage of extraneous material.

Another object, in keeping with the above object, resides in providing an assembly of parts forming an attachment for a harvester for achieving wind flow control in a harvester when attached thereto.

Other features, objects and advantages of the invention reside in the details of construction affording improved operation of portable harvesters and will be either obvious to those skilled in the art or pointed out in the following specification and claims read in view of the accompanying drawings in which:

Figure 1:
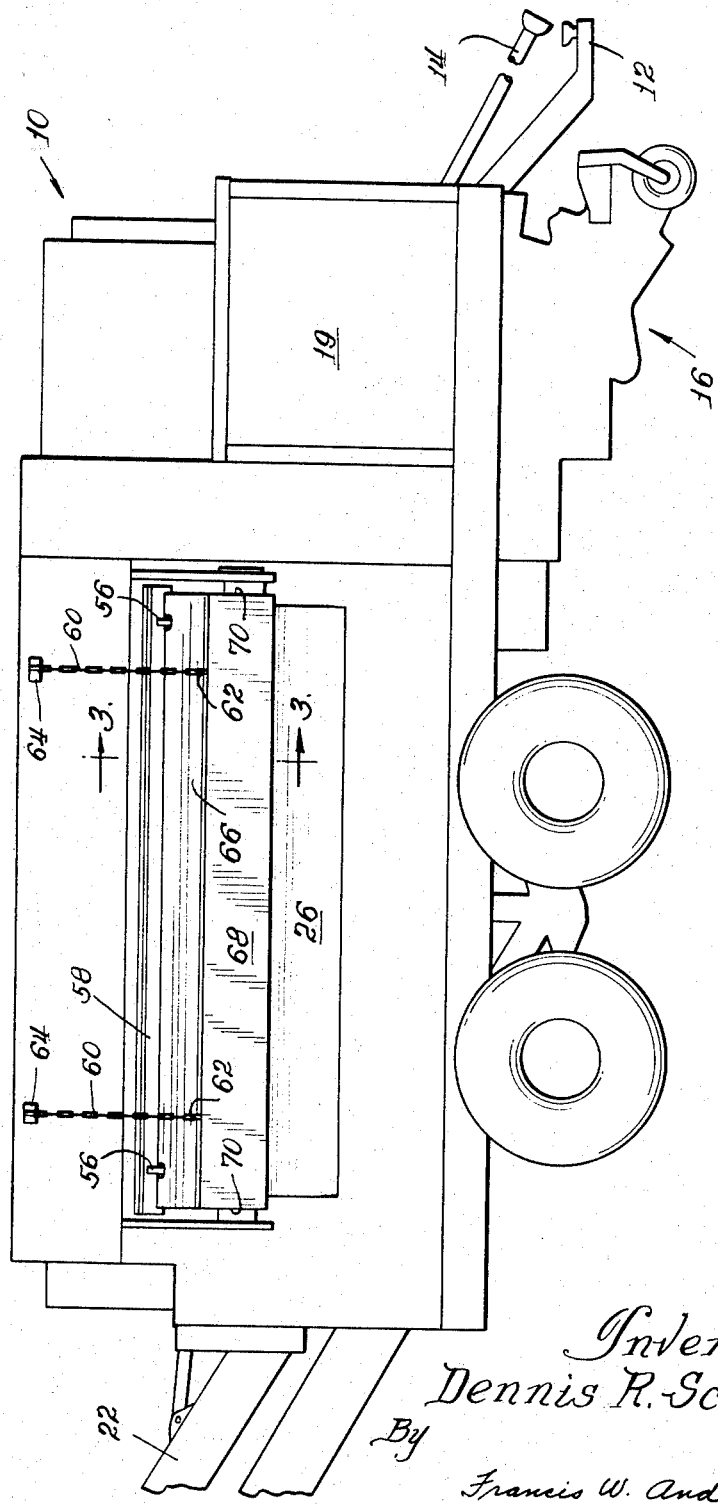
FIG. 1 is a diagrammatic side view of a portable harvester of the kind that is of the pull type.
Figure 2:
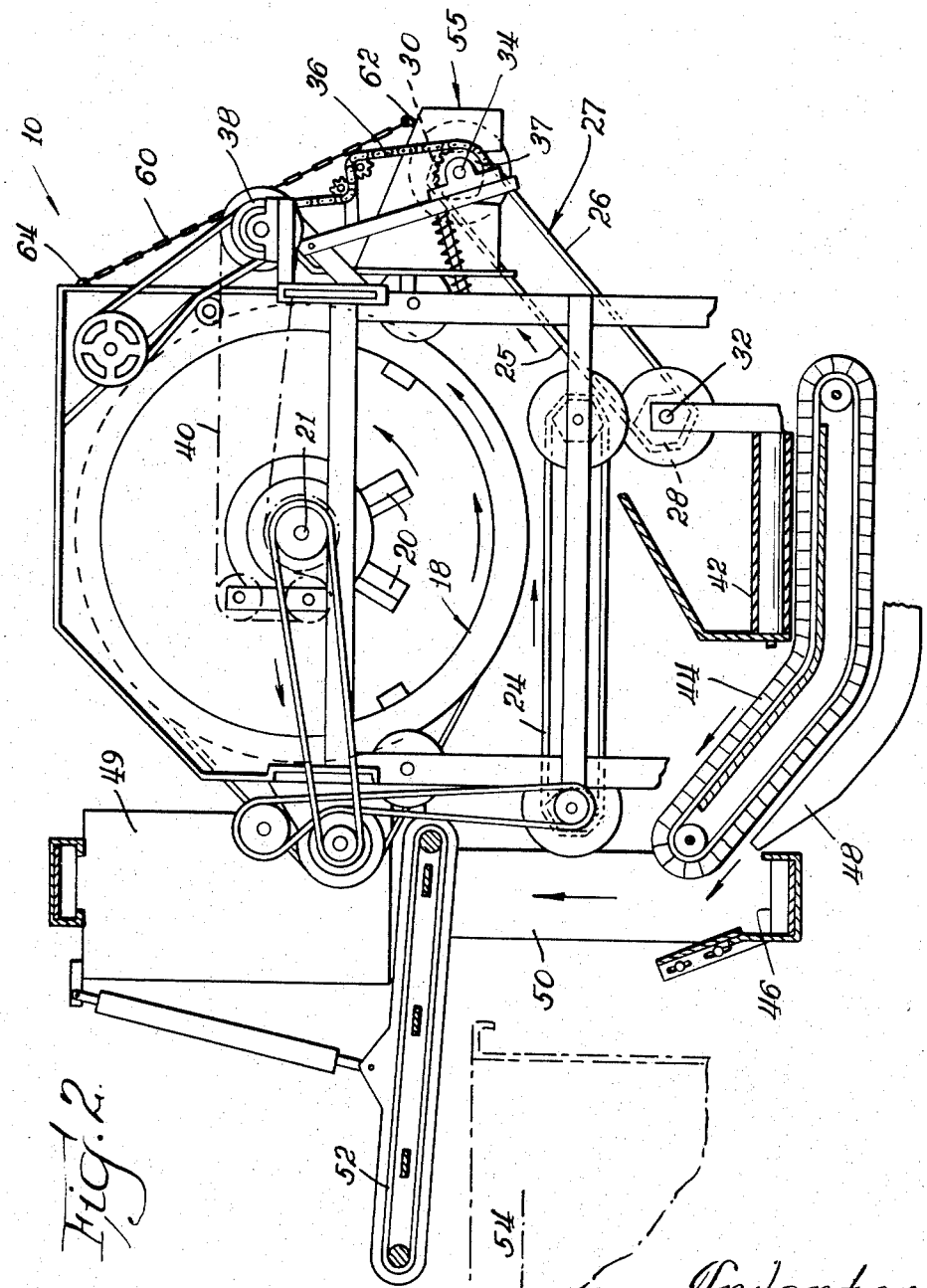
FIG. 2 is a diagrammatic rear end view, with some parts omitted for clarity.

For a general understanding of the equipment with which the invention is utilized, reference is first made to FIGS. 1 and 2. A portable harvester 10 shown in these figures is of the pull type, and is adapted to be attached to a tractor, not shown, by a hitch 12. The tractor is provided with a power takeoff 14 which drives a pickup generally indicated by the reference character 16 that picks windrowed crops from the ground and passes them upwardly and rearwardly to means elevating the crop into the open front end of a rotary screen drum generally indicated at 18, FIG. 2. The harvester is powered by an engine 19, and suitable drive means for driving all parts of the equipment.

The crop passes cyclically around within the drum 18 and is engaged by rotatable beaters 20 suitably driven by a shaft 21 in turn connected with suitable belting, chains and the like to the engine 19, FIG. 1. The crop is subjected to both the beating action of beaters 20 and tumbling action while moving around and rearwardly in the machine. The pods of leguminous crops, such as peas or the like, are burst open and the peas pass through apertures in the screen drum 18. Coarse debris and extraneous material including weeds, stems, leaves and the like pass generally rearwardly of the harvester and are, for the most part, delivered onto the conveying surface of an inclined elevator generally indicated at 22 at the left side of FIG. 1.

Fine extraneous material, along with the peas, passes through the apertures in the screen drum 18 and drops downwardly upon the upper run of a conveyor belt 24 (FIG. 2) which carries same to the right as shown in FIG. 2 and delivers it to the upper run 25 of an endless movable draper belt or apron 27, which belt has a lower return run 26. The runs 25 and 26 are trained over hexagonal drums 28 and 30 which are arranged on parallel shafts 32 and 34 respectively, and one of the shafts is driven. As shown in the drawings, the upper shaft 34 is the driven shaft and it is powered through an endless chain 36, only a portion of the chain 36 being shown, which in turn passes over sprockets 37 and 38, the latter being driven by power operated drive means 40 connected to the engine 19 in a manner well known in this art and disclosed more in detail in the above-mentioned application of Dennis R. Schultz.

The edible crop and the fine extraneous material start to move upwardly along the upper run 25. Inasmuch as peas and beans and the like are generally spherical or rounded in shape, they will roll downwardly under the influence of gravity and drop upon the upper run of a longitudinally extending belt 42 which, in the present apparatus, passes the edible crop forwardly for delivery to a lateral transfer belt 44. The belt 44 passes the edible crop onto a second longitudinally extending conveyor 46 adjacent to which an air blast issues from a jet 48 to further remove small readily air-borne fine extraneous material. The conveyor delivers the crop to an elevator 50 which lifts the crop, and deposits it in a bin 49. The bin has a normally closed bottom outlet which, when opened, will permit the crop to fall onto the upper run of an adjustably positionable conveyor 52 which, in turn, delivers the crop to a hopper 54 or the like.

The belt 27 is inclined at a suitable angle which is preferably on the order of from 30° to 35° upwardly and outwardly from beneath the screen drum and the transfer belt 24. However, it is to be noted that certain crops can be separated from extraneous material more suitably if the belt runs are disposed at slightly different angles, depending upon the tendency of the crop to roll downwardly under the influence of gravity against the direction of movement of the upper run 25 of the belt. Certain extraneous material is more irregularly shaped and tends to cling and be carried by the friction upwardly and outwardly of the harvesting equipment upon the run 25 of the inclined belt. The belt is preferably made of canvas, which material has an effective coefficient of friction with extraneous material; but not with peas and the like.

In order to prevent wind from blowing the extraneous material back into commingling relationship with the crop upon the belt 42, a valve apparatus, including a hood 55 and associated structure, is provided for preventing wind from entering the harvester through the discharge opening. The hood 55 is supported upon spaced apart hooks 56 (FIG. 1) which are carried by a longitudinally-disposed angle beam 58 secured to suitable support members on the side of the harvester 10. Additional support for the hood 55 is provided by chains 60 connected between eyebolts 62 on the hood 55 and brackets 64, the latter also being supported by side support members on the harvester 10. It is desirable that the hood structure 55 be held securely in place, but be movable and/or removable whereby operators can clean out debris that might accumulate at points in the apparatus under certain harvesting conditions, particularly when the crop is damp.

Figure 4:
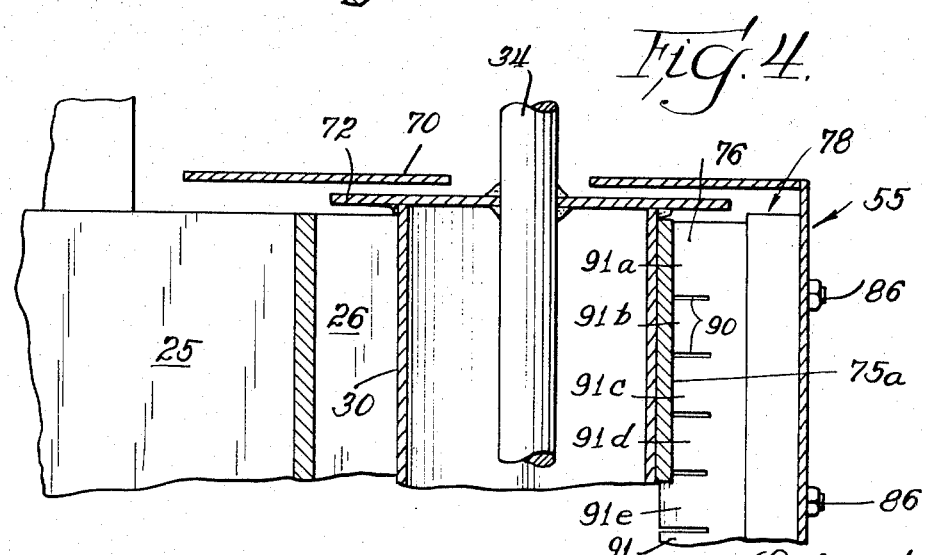
FIG. 4 is a fragmentary section taken generally along line 4—4 of FIG. 3.

The hood 55 comprises an upper wall 66, an outer deending wall 68, and a pair of end walls 70 which are substantially identical and, as shown in FIG. 4, are adjacent end flanges 72, one only being shown, which secure the drive drum 30 on the drive shaft 34. The space between the ends 70 of the hood 55 and the end flanges 72 of the drum is kept rather small in order to prevent the wind from entering the apparatus adjacent the sides of the conveyor run 25 of the belt.

Figure 3:
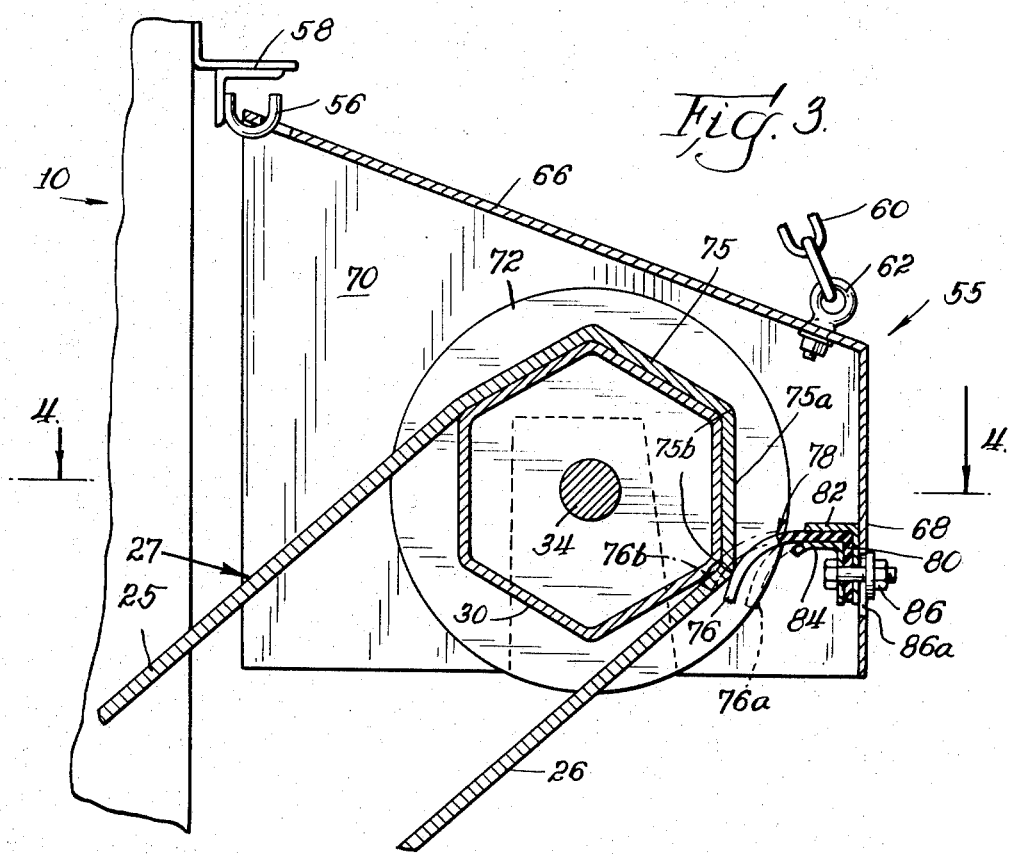
FIG. 3 is an enlarged detail section of the wind flow control structure of the invention, taken generally on line 3—3 of FIG. 1.

A bight 75 (FIG. 3) of the belt between the runs 25 and 26 passes over the hexagonal drum 30 and progressively engages a distal edge 76 of a flexible closure member 78, which at its proximal edge 80 is secured between a pair of longitudinally extending angle members 82 and 84 secured by suitable bolts 86 spaced at intervals along the outer wall 68 of the hood 55.

Although not essential to operation of this apparatus in connection with all crops, as indicated in FIG. 4, a series of slits 90 may be provided in the distal edge portion 76 of the flexible member 78. Such slits 90 form individual lips 41 on the entire free edge portion of the flexible valve member 78. Certain of the lips are movable in the presence of extraneous material, while not causing or affecting opening of adjacent lips when extraneous material may be passing downwardly and outwardly of the apparatus at a few points only. Such structure further prevents winds from moving upwardly beneath the hood 55 and thence downwardly in opposite direction of movement of the upper run 25 of the belt, whereby extraneous material on the run 25 of the belt is not blown backwardly into the path of the useful crop.

The functional flexibility of the flexible member 78 can be controlled conveniently in two ways in the present apparatus. The angle bar assembly can be adjusted upwardly and downwardly by positioning the bolts 86 up and down in associated slots 86a in the vertical wall 68 of the housing 55. In an upper position the flexible member becomes effectively stiffer, and in a lower position offers less resistance to passage of extraneous material. In addition, the chain 60 can be hooked by different links on the hooks 64 to move the flexible means 78 relatively upwardly and outwardly, or vice versa, of the bight 75.

OPERATION

With a crop, such as peas, disposed upon the upper run 25 of the belt, along with extraneous material, and moving upwardly and outwardly from the machine, under the influence of movement of the upper run 25, there is also an accompanying oscillating motion of the upper run 25 of the belt induced by the high and low points upon the hexagonal drum 30. The oscillating movement causes the peas to bounce upwardly and downwardly together with the extraneous material. Because peas are generally spherical in shape, they will separate from the extraneous material and roll under the influence of gravity downwardly and to the left as viewed in FIG. 3. The extraneous material, being irregularly shaped, will frictionally engage the upper run 25 and be carried upwardly and to the right, as viewed in FIG. 3, and move across the bight 75 downwardly toward the flexible member 78.

With extraneous material attaining a position generally at point 75a, and with the material in engagement with the distal edge 76 of the flexible member 78, the distal edge 76 will be deflected in the presence of such extraneous material to a position 76a whereby, under the influence of gravity and motion of the hexagonal drum 30, the material will be urged outwardly and downwardly of the apparatus. It is to be noted that a high point 75b of the bight 75 will exert pressure behind the material, further urging same past the edge 76.

As the point 75a on the apron approaches the position of contact with the distal edge 76 of the flexible member 78, this edge will move inwardly to a position 76b. The flexible member 78 thus remains in sealing relationship against contraflow of air upwardly and inwardly into the cleaning apparatus of the harvester.

When individual lips are formed on the flexible member 78, only individual portions of the distal edge 76 need to open in the presence of debris and hence lighter weight debris can be accommodated by the present valve than if the member 78 is continuous along its edge. Accordingly the provision of the lips makes possible the use of a heavier gauge material for the flexible means 78 than otherwise could be employed. The flexible belt is preferably made out of standard triple ply conveyor belting which has a rubber-like coating and is corded for suitable strength and life.

As mentioned previously above, air traversing at high velocity along surfaces tends to cling to the surface. As a result, rain shields, and the like, which have been used in the past for protecting cleaning aprons have, in cooperation with lower apron run 26, created an effective bell-mouth inlet for higher-than-atmospheric pressurized air directed into the exit for extraneous material. Such bell-mouth inlet converts to static pressure the energy of high velocity air due to high or gusty wind conditions, and causes entry of high velocity air above the upper lay 25. Because lower-than-atmospheric air pressure is induced within the harvester because of leeward wind reaction, air beneath the rain shield moves at high velocity inwardly and downwardly along the upper lay 25 of the apron. When such conditions prevail, the amount of extraneous material entering the useful product and delivered to the storage bin has been excessive. The contra-air-flow control means hereof obviates such condition inasmuch as the air flow is arrested by the flexible member 78 cooperable with the bight 75 of the lays 25 and 26 of the separating apron.

In the event the wind control means becomes clogged with extraneous material, the same is readily cleared as follows. Upward tension is placed on the chains 60 adjacent the eye-bolts 62. The flexible member 78 will rotate around hooks 56, acting as pivot points, and will move outwardly and upwardly away from contact with the bight 75. The entire surface of the bight 75 can thus be exposed for ready removal of the material clogging the control means 55.

Although the best mode contemplated for carrying out the present invention has been herein shown and described, it will be apparent that modification and variation may be made without departing from what is regarded to be the subject matter of the invention as set forth in the appended claims.

I claim:

1. In a harvester for vine crops such as peas and the like, said harvester having means for separating the crop from extraneous material such as parts of leaves, vines, pods and debris, said separating means including a power operated continuous belt trained around a drum and having a material conveying upper run with a discharge portion running outwardly of the harvester for removing extraneous material from the harvester; apparatus for preventing wind from blowing extraneous material backward along said upper belt run and into the harvester, said apparatus comprising housing means adjacent the sides of the discharge portion of said upper run of said belt and said drum, and means forming a generally airtight housing with said side housing means and disposed above the discharge portion of said upper conveyor run, said latter housing means including flexible closure means having a free edge sealingly engaging said conveyor belt for preventing wind from passing into said housing means and over the upper run of said belt in counter flow relationship to extraneous material moving outwardly of the harvester, said flexible closure means being flexed by material carried thereunder by said belt.

2. In a harvester for vine crops such as peas and the like, said harvester having means for separating the crop from extraneous material such as parts of leaves, vines, pods and debris, said separating means including a power operated inclined continuous belt trained around a drum and having an upper run movable upwardly and outwardly of the harvester for causing the crop and extraneous material to separate under the influence of gravity; apparatus for preventing wind from blowing extraneous material into the path of travel of the separated crop comprising means forming a generally airtight housing over the top and adjacent the sides of said upper run of said belt and said drum, said housing having a downwardly facing opening outboard of said drum affording passage of extraneous material out of the harvester, and flexible closure means for said opening attached to said housing, said closure means having an inwardly extending edge sealingly associated with said belt for preventing wind from passing into said housing and over said upper run of said belt in counter flow relationship to said extraneous material moving upwardly and outwardly of the harvester, said closure means being flexed by extraneous material away from said belt to effect passage of said material through said opening.

3. A harvester according to claim 2, wherein said drum has high and low points causing said belt trained therearound to present a series of high surfaces for driving extraneous material past said edge of said flexible closure means and through said opening.

4. A harvester according to claim 2, wherein said housing is mounted on pivot means upon the harvester at an inner edge of said housing, and being movable about said pivot means in a sense of movement for causing said flexible closure means to move upwardly and outwardly away with relationship to the area of contact thereof with said apron.

5. A harvester according to claim 2, wherein said edge of said flexible closure means is slitted to form a series of lips, each lip being movable in an opening direction by engagement with extraneous material while not affecting operation of adjacent lips.

6. A harvester according to claim 2, wherein said housing is mounted on pivot means upon the harvester at an inner edge of said housing, and is movable about said pivot means in a direction for causing said flexible closure means to move upwardly and outwardly away with relationship to the area of contact thereof with said belt.

7. An improvement generally as set forth in claim 2, wherein said flexible closure is adjustably mounted on said housing for varying the effective flexibility thereof whereby to favorably accommodate extraneous materials having different physical attributes.

8. An improvement generally as set forth in claim 2, wherein said housing is adjustably positionable whereby to favorably accommodate extraneous materials having different physical attributes.

9. A machine according to claim 2 wherein said flexible member attaching means includes a pair of spaced longitudinally extending angle bars adjustably secured to said housing.

References Cited

UNITED STATES PATENTS

| 1,645,324 | 10/1927 | Hamachek | 209—114 |
| 2,213,387 | 9/1940 | De Back | 209—114 X |
| 2,519,929 | 8/1950 | Redler | 222—415 X |
| 3,176,884 | 4/1965 | Klouda | 222—415 X |

ALLEN N. KNOWLES, *Primary Examiner.*